United States Patent [19]

Kotcharian

[11] 4,378,403
[45] * Mar. 29, 1983

[54] LAMINATED COMPOSITE MATERIAL USABLE IN HEAT-INSULATING COMPOSITE WALLS

[75] Inventor: Michel Kotcharian, Paris, France

[73] Assignee: Technigaz, France

[*] Notice: The portion of the term of this patent subsequent to Aug. 8, 1995, has been disclaimed.

[21] Appl. No.: 914,680

[22] Filed: Jun. 12, 1978

Related U.S. Application Data

[63] Continuation-in-part of Ser. No. 662,414, Mar. 1, 1976, Pat. No. 4,105,819.

[30] Foreign Application Priority Data

Mar. 4, 1975 [FR] France ................................ 7506732
Feb. 20, 1976 [FR] France ................................ 7604810

[51] Int. Cl.³ ........................ B32B 17/02; B32B 17/10
[52] U.S. Cl. .................................. 428/251; 428/285; 428/286; 428/334; 428/337; 428/339; 428/433; 428/442; 428/425.6; 220/901
[58] Field of Search ............... 428/213, 215, 246, 251, 428/252, 285, 286, 433, 256, 284, 457, 192, 334, 337, 339, 216, 268, 442, 425.6; 220/901; 114/74 A, 74 R

[56] References Cited

U.S. PATENT DOCUMENTS

| 1,801,666 | 4/1931 | Geer | 428/285 |
|---|---|---|---|
| 2,392,272 | 1/1946 | Snyder | 428/468 X |
| 3,272,373 | 9/1966 | Alleaume et al. | 220/901 X |
| 3,318,517 | 6/1964 | Charbonneau | 428/251 X |
| 3,489,311 | 1/1970 | Folkerts et al. | 220/901 X |
| 3,769,118 | 10/1973 | Tariel et al. | 220/901 X |
| 3,795,573 | 3/1974 | Smith et al. | 220/901 X |
| 3,931,424 | 1/1976 | Helf et al. | 220/901 X |
| 3,993,213 | 11/1976 | Burge et al. | 220/901 X |
| 4,105,819 | 8/1978 | Kotcharian | 428/286 X |

Primary Examiner—Alexander S. Thomas
Attorney, Agent, or Firm—Steinberg & Raskin

[57] ABSTRACT

A relatively thin, flexible, impervious, sheet-like laminated building material comprising at least three continuous overlying layers of yielding material adapted to withstand very severe cold conditions, bonded together and consisting of at least one first mechanically strong supporting endmost layer having a thickness of from about 0.3 to about 0.6 mm; at least one impervious film-like layer having a thickness of from 0.04 to 0.10 mm and at least one second endmost lining layer providing at least a mechanical and at least temporary protection and having a thickness from about 0.3 to 0.6 mm.

2 Claims, 2 Drawing Figures

LAMINATED COMPOSITE MATERIAL USABLE IN HEAT-INSULATING COMPOSITE WALLS

The present invention is a continuation-in-part of United States patent application Ser. No. 662,414, filed on Mar. 1st, 1976, now U.S. Pat. No. 4,105,819.

The present invention relates generally to and has essentially for its subject matter, by way of a novel at least semifinished industrial product, a composite relatively thin and flexible or yielding, sheet-like or strip-like or web-like, composite material for building or structural, lining, facing, covering, lagging or like fitting purposes, having a substantially impervious or fluid-tight or leak-proof laminated construction and the various applications and uses resulting from working same or putting same into practice as well as the various systems, assemblies or arrangements, buildings or constructions, equipments, plants and installations such as in particular improved cryogenic enclosures or like fluid-confining means provided with or incorporating such a material. The invention is also applicable to building elements and members or articles of manufacture or like goods forming in particular possibly modular composite panels or blocks or composite plates for lining, facing, lagging or wrapping, filling or like fitting purposes containing the aforesaid material.

In the prior state of the art there are presently known heat-insulated sealed or fluid-tight, impervious or leak-proof tanks for storing, preserving, transporting or coveying in particular very cold fluids and more specifically liquids at very low temperatures such as for instance liquified natural gases or methane which are in particular contained in multiple-wall tanks of for instance the so-called integrated kind with a substantially rigid outer structure forming a self-supporting envelope or casing, said tank comprising an innermost envelope for directly confining the fluid held therein, said envelope being located inside of and spaced from the outer envelope and forming a thin wall consisting of a substantially flexible impervious membrane made most often from a foil or thin sheet of metal such as aluminum, stainless steel, so-called Invar alloy or from any other suitable metal exhibiting equivalent properties or like qualities of resistance to very low temperature conditions. The intermediate space between the outermost and innermost envelopes is filled with an intermediate relatively thick layer of heat insulating material secured to the outer structure for being carried or supported by the latter and spacing said membrane from said outer structure, which membrane is applied against said intermediate layer which consists preferably of a substance or compound adapted to bear mechanical loads (such as weight, hydrostatic pressure, inertial forces, dynamic stresses or efforts etc.) applied to the body of contained fluid and to convey them to said outer structure. Said metal membrane is either practically insensitive to or unaffected by dimensional variations caused by deformations or strains such as contractions and expansions of thermal origin when it is made of so-called Invar alloy for instance or it is formed with excess material for instance in the shape of corrugations, pleats or similar folded formations for absorbing thermal deformations when it is made from another metal. Such tanks adapted in particular for the preservation or storage of liquified natural gases (generally stored at a pressure close to ambient atmospheric pressure) may either form stationary storage enclosures or transportation tanks mounted on tanker-ships or conveying land-vehicles, in which case the inner tank-casing, shell or envelope is integrated into the ship's hull of which it then forms the hold for loading liquid cargo therein or into the land-vehicle body structure, the hull or body then forming the aforementioned outer self-supporting structure or rigid envelope.

The aforesaid metal membrane the exposed inner face or side of which is in direct contact with the fluid contained therein provides a so-called primary sealing barrier but the innermost envelope consisting of said membrane is often doubled by at least another intermediate envelope forming an impervious wall lying between said outer structure or envelope and said primary barrier to constitute a safety or so-called secondary sealing barrier which is often substantially of the same nature and configuration as the primary sealing barrier. Such metal membranes forming a normal (or main) sealing barrier and a safety (or auxiliary) sealing barrier, respectively, suffer from the inconvenience of being of a relatively complicated and therefore expensive preparation, manufacture, building or construction as well as of a relatively difficult and costly positioning, mounting assembly and fastening and they are generally made from noble and accordingly expensive metals while being relatively heavy in weight.

One main object of the invention is accordingly to remove or overcome the aforesaid drawbacks by providing a new material forming a relatively thin and flexible or yielding sheet-like, plate-like or strip-like substantially fluid-tight laminated semi-product which is characterized in that it comprises at least three overlying continuous layers or laminations made from flexible material adapted to withstand very severe cold conditions and assembled or connected together by bonding, sticking, gluing, welding or through a like or equivalent superficial adhesive connection and consisting of one intermediate layer placed in a sandwich-like manner between two opposite layers, namely:

(a) at least one first end layer forming a tough or mechanically strong supporting means having a thickness of from about 0.3 to about 0.6 mm;

(b) one intermediate layer consisting of a film or skin impervious in particular to gaseous fluids and having a thickness of from about 0.04 to 0.10 mm; and (c) at least one mechanically resistant second end layer forming a protective lining in the case the composite material comprises only three layers, said second end layer having a thickness from about 0.3 to 0.6 mm.

According to a first preferred embodiment of the invention, the aforesaid intermediate layer is made from a material selected from the group consisting of aluminum and stainless steel while said first end layer is a flexible mineral fiber fabric, notably a glass fiber fabric, and said second end layer is also a flexible mineral fiber fabric, notably a glass fiber fabric, each said first and second end layers having a thickness between 0.3 and 0.6 mm.

In a more specific embodiment, each of said opposite end layers is a flexible glass fiber fabric having preferably a thickness between 0.3 and 0.4 mm and said intermediate layer is an aluminum sheet or foil having preferably a thickness between 0.04 and 0.07 mm.

According to a second preferred embodiment, the laminated material of the first embodiment, comprising the three aforementioned layers, comprises also a fourth layer made from an elastomeric material and secured to the aforesaid second end layer, said fourth layer having preferably the construction of a coating applied originally in a finely divided state and forming a continuous covering of the laminated sheet material, the material of this fourth layer being selected from the group consisting of a polyurethane elastomer, a chlorosulfonated polyethylene elastomer and a polychloroprene elastomer and having preferably a thickness of from about 0.3 to 1 mm.

The novel and improved laminated material according to the invention offers the advantage of a very simply and easy manufacture, working and use as well as of a ready laying or mounting in particular through simple bonding by means for instance of a suitable synthetic resin so that it is of a very economical use and production while exhibiting outstanding qualities, capabilities or abilities of behaviour under cold conditions, mechanical endurance and physical durability and preservation.

The invention is of use in particular in some specific applications such as a fluid-tight heat-insulated tank for very cold fluids, of the type previously defined, wherein its primary sealing barrier is made from the aforesaid composite material. In such a case, use is preferably made of the composite material of the abovementioned second embodiment the fourth layer of which of elastomeric nature is then placed in direct contact with this fluid.

When the aforesaid tank includes a secondary sealing barrier the latter may be made according to the invention of laminated material preferably according to the aforesaid first embodiment or according to the aforesaid second embodiment, the fourth layer of which (of elastomeric nature) being then positioned in such a manner that this layer is the innermost layer of the laminated material within the composite heat-insulating and fluid-tight wall of the said tank.

The invention will be better understood and other objects, characterizing features, details and advantages thereof will appear more clearly as the following explanatory description proceeds with reference to the accompanying diagrammatic drawings given by way of non limiting examples only illustrating various presently preferred specific forms of embodiment of the invention and wherein.

Figure 1:
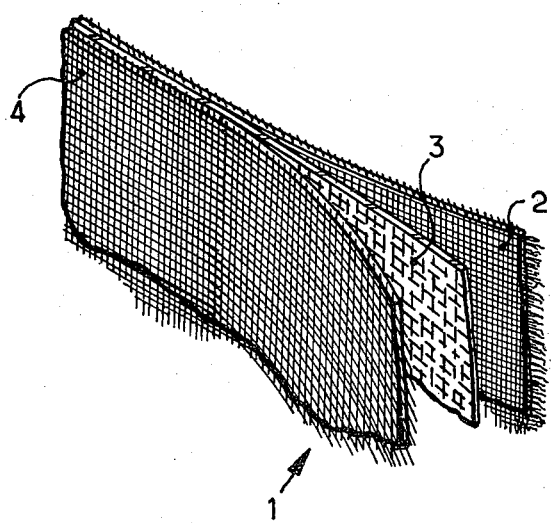
FIG. 1 is a fragmentary perspective view partially in section, with parts broken away, showing a composite material according to the first embodiment of the invention, said material being adapted to form for example a secondary sealing barrier.

According to the embodiment shown in FIG. 1 of the drawings the composite material of the invention generally denoted by the reference numeral 1 comprises a first end layer 2 and a second end layer 4 each consisting of a fabric made from mineral fibres such as glass fiber and having a thickness of from about 0.3 to about 0.6 mm, preferably of from about 0.3 to 0.4 mm. The intermediate layer 3 is made from a film, skin, foil or thin sheet of a metal such as aluminum or stainless steel, and has a thickness of from about 0.06 to about 0.10 mm, preferably 0.04 to 0.07 mm.

The structure shown in FIG. 1 may set a limit upon the utilization capabilities of the material 1 having a construction as defined hereinabove to a relatively physical position or location incorporated into or inside of a body of surrounding coherent or solid material in which said first-named material is thus embedded or entrapped.

Figure 2:
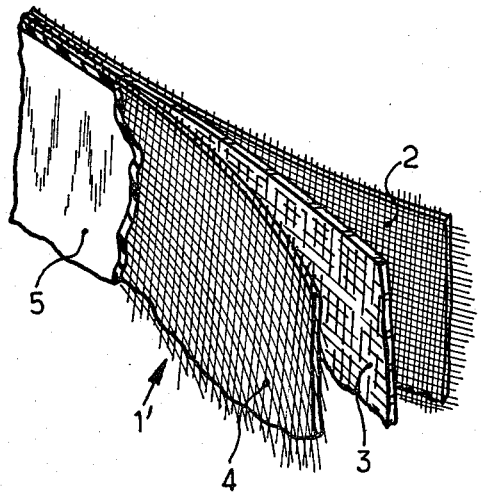
FIG. 2 is a view similar to FIG. 1 but showing a composite material according to the second embodiment of the invention and being adapted to form for example either a primary sealing barrier or a secondary sealing barrier.

The construction shown in FIG. 2 enables to extend the possibility of using the material of the invention to a wide variety of utilizations and services thereby substantially broadening the scope of its applications.

The arrangement of FIG. 2 offers the advantage of enabling the use of the aforesaid material as an exposed either visible or hidden superficial lining end layer onto any wall structure thereby being very advantageous from an economical standpoint since the material is relatively inexpensive and of an easy workability as well as of a simple application while exhibiting a satisfactory mechanical strength or toughness as well as a good thermal behaviour.

According to the embodiment shown in FIG. 2 the composite laminated material generally designated by the reference numeral 1' comprises an intermediate metal layer 3 having the nature previously defined (aluminum or stainless steel) and a thickness of from about 0.04 to 0.10 mm and preferably 0.04 to 0.07 mm, which is positioned between two opposite end or bounding layers 2 and 4, respectively, each one comprising a fabric or web of glass fiber having a thickness between about 0.3 and 0.6 mm, preferably about 0.3 to 0.4 mm, these three layers being bonded or laminated together. One of the end layers which is for instance adapted to remain exposed, i.e. layer 4, to form an exposed uncovered face after the material 1' has been applied against an end face of a wall structure (to form for example a primary barrier therefor when said wall structure together with said primary barrier constitutes the heat-insulating composite wall of a cryogenic tank) will receive after the material 1' has been laid a protective film of elastomeric material 5 having the nature stated hereinabove, namely selected from an elastomric polyurethane, polychloroprene or chlorosulfonated polyethylene, and applied as by being spread in a powdery condition onto the wall surface thus consisting of the material 1' after the latter has been laid onto the supporting structure. The film 5 thus constituting the exposed end or boundary face of the material 1' will protect the layer 4' against mechanical effects, actions or attacks of any kind.

The aforesaid polyurethane elastomer is notably the substance known under the name of "Adiprene", the polychloroprene elastomer is notably Neoprene and the chlorosulfonated polyethylene is notably the substance known under the name of "Hypalon".

The present invention is also concerned with a process of assembling in surface a plurality of sheets made from the above-mentioned composite material having two fibrous end layers, this process being characterized in that the adjacent sheets are disposed in such a manner that their peripheral edges are superimposed, an adhesive composition being located between the two fibrous end layers in mutual content, belonging to said superimposed edges, so as to penetrate between the fibers of the said fibrous end layers and such to ensure a very strong binding between the adjacent sheets.

The embodiment wherein the two end layers of the laminated composite material are fiber glass layers produce surprising or unexpected effects since this triplex material enables the obtainment, in an extremely easy manner, of a coating for a highly fluid-tight cryogenic tank by juxtaposing in surface, as previously indicated, sheets of the said material and by binding them along their superposed peripheral edges on a bed of heat insulating blocks or panels, by means of an adhesive, without the necessity of applying a squeezing pressure, the assembling and gluing operation being performable at room temperature.

This outstanding advantage is essentially due to the symmetrical construction of the triplex material, since this embodiment enables the mutual contact of two rough or coarse surfaces, consisting of fibers, in such conditions that the bonding strength is maximum on the one hand due to the uneven surfaces of the involved overlaying layers, resulting in a strong grip or fast clinging of both layers, along the peripheral edges of the sheets of the laminated composite material and on the other hand owing to the penetration of the adhesive within each said layers, on both sides of their interface, this penetration being precisely permitted by the porous structure of such layers.

Under such circumstances, a very satisfactory bonding may be obtained without applying an external squeezing pressure and without heating so that the assembling operation may be easily carried out manually.

Moreover, the risk of undergoing separation through a cleaving action which would exist in the case of the adhesive bonding of smooth or even surfaces is avoided by using the invention composite material of the present invention.

Comments will new be given as to the criticality of the various respective thicknesses of the different layers of the invention material, as to the obtention of excellent characteristics of suppleness, mechanical strength and fluid-tightness.

In the first place, using glass fiber layers having a thickness lower than 0.3 mm would result in a tensil strength insufficient to support the edges stresses caused by the contraction of the heat-insulating blocks or panels backing the triplex material, such stresses being due to the thermal contractions to which said panels are subjected; moreover these glass fiber layers would not be likely to resist the stresses or strains caused by an accidental cracking of such an underlying panel.

On the other hand, the thicknesses of the glass fiber layers must not be higher than about 0.6 mm, since by using values higher than 0.6 mm, the tensile stresses due to the thermal contraction of the material could lead to the breakage of the heat-insulating wall in the dihedral angles thereof where are located the anchoring means which enable to fasten the invention material and to transfer and apply to specific areas the stresses resulting from the thermal contraction.

Using an overly thick intermediate layer, having a thickness higher than about 0.1 mm, would lead to stresses, resulting from the thermal contraction, which could cause the breakage of the heat-insulating wall in the dihedral angles thereof. Moreover, such a high thickness would render the composite material more rigid and less easy to handle or use.

Moreover, the use of an intermediate layer having a thickness lower than 0.04 mm would result n a severe risk of having a permeable or porous structure for this layer, resulting in the loss of the fluid-tightness of the whole composite material.

It must also be noted that, should the said intermediate layer be made of aluminum, the aforesaid thickness range, i.e. 0.04 to 0.10 mm, enables to have aluminum sheets of great size, obtained by rolling and having for instance a width as high as 1.50 m, and thus to prepare and use a composite material in the form of great area surface.

As regards the elastomeric lining used as covering layer of a fibrous end layer in a four layer material, it must be pointed out that a thickness lower than 0.3 mm would not enable this elastomeric lining to perform its function of mechanical protection; more particularly, in view of the surface irregularities of the fibrous-layer-elastomeric linking interface, the elastomeric layer has necessarily a varying thickness, the lather being minimum in the region of the peaks or bumps of the fibrous layer surface, so that the mechanical protection is insufficient or absent in such local areas or zones since the elastomer is more or less removed, by attrition, in such zones, which denudes the underlying glass fibers and results in a risk of breakage of the glass fiber layer. In contrast to this, when the thickness of the elastomeric lining or layer is between 0.3 and 1 mm, all zones of the underlying fibrous layer are perfectly protected and there is not any risk of breakage for this latter layer.

The use of glass fiber preferably to other types of fibers is justified by the high mechanical resistance of glass fiber with respect to such other fibers, except for the fibers made of aromatic polyamides or aramides, for example such as those known under the trade name "Kevlar" (manufactured by DUPONT DE NEMOURS); however, in spite of their great mechanical resistance which is higher than that of glass fiber, the fibers of Kevlar have a Young modulus and a thermal expansion coefficient very much higher than those of glass fiber and lead to the appearance of stresses, due to the thermal contraction, very much higher than those generated by the thermal contraction of the glass fiber fabric (assuming that the composite material constitutes a fluid-tight barrier belonging to a heat insulating wall structure of a cryogenic tank). Consequently, glass fiber exhibits a whole set of optimum characteristics which justifies its use as a highly preferred material in the invention composite material.

Obviously, the glass fiber layer or glass fiber layers of the composite material according to the present invention may have any suitable particular structure or texture, a preferred texture being that of a woven glass fiber fabric in view of its higher mechanical resistance.

It must also be noted that the composite material according to the invention exhibits an excellent behaviour to cyclic fatigue and that its tightness with respect to either liquid or gas is very significantly improved with respect to the other supple membranes used in the heat-insulating composite walls of the prior art tanks. Thus, when the pressure difference is of about 14 psi between the two sides of the membrane, the following results are obtained, for a leakage flow rate D, on the one hand in the case of a membrane made with an invention material comprising two fiber glass end layers and an intermediate aluminum layer and on the other hand in the case of membranes made of, respectively, "Mylar" (trade mark of a product manufactured by DUPONT DE NEMOURS), elastomeric silicone or butyl rubber:

invention material: $D = 6 \times 10^{-3}$ cm$^3$/j-m$^2$
membrane in "Mylar": $D = 12$ cm$^3$/j-m$^2$
membrane in silicone elastomer: $D = 3.9 \times 10^5$ cm$^3$/j-m$^2$
membrane in butyl rubber: $D = 1.9 \times 10^3$ cm$^3$/j-m$^2$ The prior art membranes referred to hereabove are also difficult to use on an industrial scale, since the assembling operations of a final continuous membrane consisting of sheets of the corresponding materials require a welding or gluing procedure with application of a squeezing pressure in contrast with the membrane made from the invention material as already indicated.

The following table shows the tensile strength characteristics of a composite material according to the first preferred embodiment thereof and comprising an intermediate aluminum layer between two glass fiber end layers, each glass fiber layer having a thickness of about 0.3 mm and the aluminum layer a thickness of about 0.04 mm.

|  | Test temperature | |
| --- | --- | --- |
|  | 20° C. | −196° C. |
| Strength required to break one meter of the membrane | 16.5 U.S.t | 28.6 U.S.t |
| stress at breaking $\sigma_R$ | 42,900 psi | 750 psi |

It should be understood that the invention is not at all limited to the forms of embodiment disclosed and shown which have been given by way of examples only. In particular, it comprises all the means constituting technical equivalents of the means described as well as their combinations if same are carried out according to its gist and used within the scope of the appended claims.

What is claimed is:

1. A laminated composite material particularly adapted for use as a fluid-tight primary or secondary barrieer in a heat-insulating composite wall in contact with a cold fluid such as liquified natural gas, methane, or the like, said laminated sheet material comprising four layers secured to each other for defining between themselves a pair of interfaces situated respectively between two of said layers, including a first end layer having a thickness of from 0.3 to 0.6 mm, a second end layer having a thickness of from 0.3 to 0.6 mm, a third intermediate layer, the latter intermediate layer being in the form of a flexible sheet material forming a fluid-impervious film, the thickness of which is from about 0.04 to 0.10 mm and material of which is selected from the group consisting of aluminum and stainless steel, each said first and second end layers being a flexible fabric made of glass fibers, and a fourth layer secured to said second end layer and having the construction of a coating applied originally in a finely divided state nd forming a continuous covering, said coating being selected from the group consisting of a polyurethane elastomer, a polychloroprene elastomer, and a chlorosulfonated polyethylene elastomer.

2. The material of claim 1, wherein said fourth layer has a thickness of from about 0.3 to 1 mm.

* * * * *